United States Patent [19]

Sehlbach et al.

[11] 4,195,495
[45] Apr. 1, 1980

[54] UNIVERSAL JOINT

[75] Inventors: Gerd Sehlbach; Ditmar Klischat, both of Essen, Fed. Rep. of Germany

[73] Assignee: Gelenkwellenbau GmbH, Essen, Fed. Rep. of Germany

[21] Appl. No.: 882,372

[22] Filed: Mar. 1, 1978

[30] Foreign Application Priority Data

Mar. 15, 1977 [DE] Fed. Rep. of Germany ....... 2711177

[51] Int. Cl.² ............................................... F16D 3/26
[52] U.S. Cl. ..................................... 64/17 R; 64/17 SP
[58] Field of Search ......................... 64/17 R, 17 SP, 7

[56] References Cited

U.S. PATENT DOCUMENTS

| 2,170,315 | 8/1939 | Wonderly | 64/17 R |
| 2,286,182 | 6/1942 | Amberg | 64/21 |
| 2,687,024 | 8/1954 | George | 64/7 |
| 3,045,454 | 7/1962 | Rueb | 64/17 SP |

FOREIGN PATENT DOCUMENTS 961748 6/1964 United Kingdom ..................... 64/17 R
1389649 4/1975 United Kingdom ..................... 64/17 R Primary Examiner—Charles J. Myhre
Assistant Examiner—R. C. Turner
Attorney, Agent, or Firm—Toren, McGeady and Stanger

[57] ABSTRACT

A universal joint includes first and second yokes with a bore extending through each yoke. A cross trunnion having cylindrical bearing pins is carried between the first and second yokes with the bearing pins supported in the bores of the yokes. Hollow cylindrical bearing housings carried by the yokes containing roller or slide bearings may be used for journalling the bearing pins in the yokes. A stop member is carried by each of the yokes, and each stop member has an end face which is arranged to engage the end face of the other stop member to limit the amount of angular deflection of the universal joint. In one embodiment, the stop members are formed by limit bolts extending axially from each of the yokes into an axial bore of the trunnion. In another embodiment, the stop members are formed by axially adjustable stop collars carried coaxially on each yoke.

7 Claims, 8 Drawing Figures

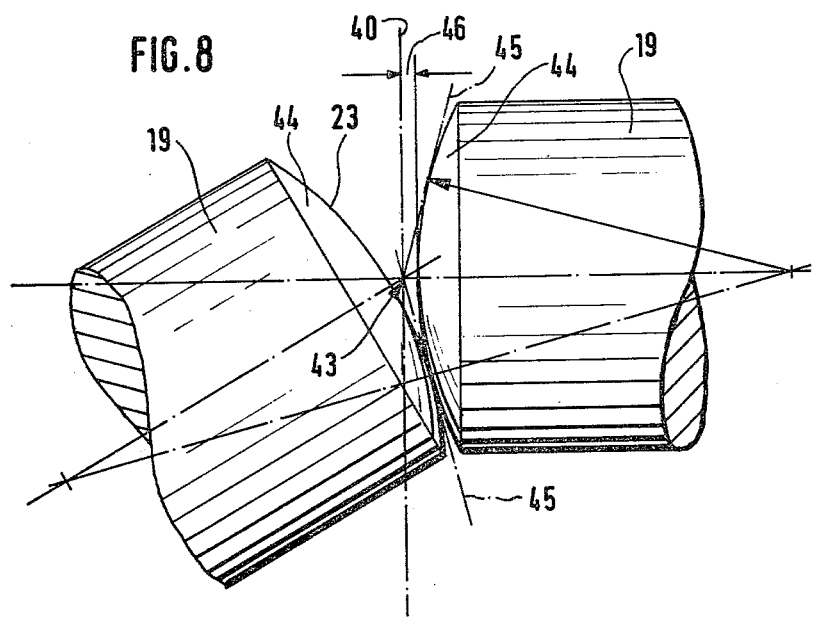
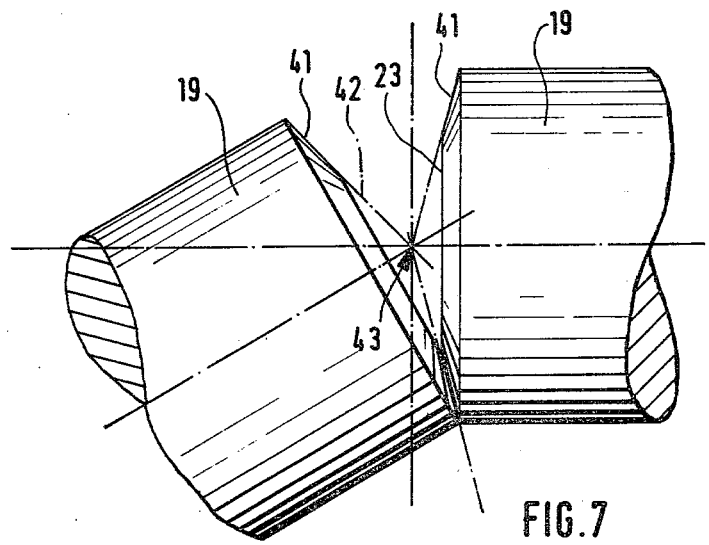

UNIVERSAL JOINT

BACKGROUND OF THE INVENTION

The present invention relates generally to a universal joint of the type formed by a pair of yokes or bifurcated members having bores which axially receive the cylindrical bearing pins of a cross trunnion which is carried between the yokes, and more particularly relates to a means for limiting the angular deflection of such a universal joint.

Conventional universal joints intended for use in flexibly coupling a drive shaft to a roller in a rolling mill, have connecting wobbler elements or adaptors for coupling such a roller to a cardan type transmission shaft. A disadvantage of this type of coupling arrangement is that when the rollers are changed, the connecting wobbler elements may assume different maximum deflection angles depending upon the existing rotational position of the transmission shaft. This is a result of the fact that when a coupling flange with the associated yoke happens to occupy a position lying in the plane of two trunnion bearing pins, it will deflect or be displaced from its rotating position through a smaller angle than when the yoke occupies a position lying in a plane within an angular range between the planes of the two sets of bearing pins of the trunnion, in which event, because of the kinematics of a cardan type joint, the resulting angular displacement will be larger than in the joint plane. In other words, if the shaft stops rotating in a position in which the yokes lie in a plane other than the plane in which the horizontal or vertical trunnion pins lie, one yoke of the joint will deflect through an angular displacement with respect to the other yoke, when the joint is disconnected from a driven roller, which is greater than the amount of angular displacement experienced when the shaft comes to rest with a yoke lying in the plane of the pins. In effect, this means that a maximum defined limit of angular displacement can only be achieved in four precise positions, more specifically only at 90° intervals, i.e., whenever two of the bearing pins of the trunnion coincide with either the horizontal or vertical plane. In all other positions, the amount of angular displacement of one yoke of the joint with respect to the other will depend upon the angular position of the yoke with respect to the horizontal or vertical planes when the shaft comes to rest.

In the prior art, such as in U.S. Pat. No. 2,687,024 and Canadian Pat. No. 898,539, transmissions having universal joints making use of stop faces to limit the amount of joint deflection are known. The capability of limiting the amount of angular displacement of one joint member with respect to the other in such prior art is, however, restricted to only four positions, i.e., the 90° positions. The rotational angles at which the stop faces can be used to engage each other in order to limit the displacement of one joint member with respect to the other are confined to the positions in which the coupling axes are in either precise horizontal or vertical planes.

It is accordingly a principal object of the present invention to provide a universal joint in a cardan type shaft in which the amount of angular displacement of one joint member with respect to the other can be limited to a precisely predetermined value regardless of the rotational position of the cardan type shaft.

Other objects, features and advantages of the present invention will become apparent from the description of the invention in connection with the accompanying drawings which will be described more fully hereinafter.

SUMMARY OF THE INVENTION

The foregoing object is generally accomplished by providing a universal joint having first and second yokes with a cross trunnion carried between the yokes and a stop member carried by each of the yokes, each of the stop members having an end face adapted to engage the end face of the other stop member to limit the amount of angular deflection of the joint to a predetermined maximum value at any angle of rotation.

In a first embodiment of the invention, a cavity or axial bore is provided in the cross trunnion and a limit bolt is carried concentrically with the axis of rotation of each yoke of the joint and extends axially into the bore of the trunnion. The facing ends of the limit bolts have a stop face arranged concentric with respect to the axis of rotation and are adapted to engage each other as the stop members to limit the angle of deflection.

As a result of this arrangement, the limit bolts can be preset in the yokes of the joint to prevent angular displacement of one yoke with respect to the other beyond a predetermined maximum regardless of the rotational angular position of the shaft carrying the joints. The limit bolts which have their end faces bearing against one another within the hollow interior of the cross trunnion will therefore ensure that a given diameter of rotation of the joint will not be exceeded. The end faces of the cooperating limit bolts will engage each other only at the point of maximum permissible angular displacement thereby preventing further angular displacement. The end faces of the limit bolts will not come into contact with each other at any time during normal rotation of the drive shaft for normal working of a rolling mill, since any deflection angle of the joint during actual rolling operation will be less than the deflection angle encountered during operations involving the replacement of a roller or the fitting or removing of wobbler connecting elements, at which time the cardan type shaft will be at rest. Accordingly, there will be no significant wear encountered by the end faces of the limit bolts.

Alternatively, in a second embodiment of the invention, an axially adjustable stop collar is coaxially carried on each yoke. The facing ends of each of the collars will serve as stop faces to engage each other at the point of maximum permissible angular displacement of one yoke of the joint with respect to the other.

This arrangement may be used where existing assembly conditions for the flexible coupling shaft are such as to permit angular displacements in excess of the radius of rotation of the joint. In this embodiment, as in the embodiment employing the limit bolts, the stop faces of the stop collars are completely out of engagement with each other when the rollers of the mill are being rotatably driven. Accordingly, the stop faces of the collars will experience little significant wear.

Significant advantages are achieved when using either of the foregoing arrangements of the present invention in the couplings for the drive of the rollers of a rolling mill, since these arrangements allow the wobbler connecting elements to be removed from the rollers, for replacement of the rollers, and for refitting regardless of the rotational position of the drive or transmission shafts when the transmission shafts are brought to a stop. This is a result of the fact that the coupling which carries the wobbler element will be angularly displaced with respect to the axis of rotation of the transmission shaft only up to a maximum predetermined angle.

Since in most cases it is desirable to limit the amount of joint deflection to a single predetermined angle, a further feature of the present invention provides that the stop faces on the stop members be conical or tapered surfaces having their pitch axes (along the slant surfaces) intersecting with each other at the center of the joint. The advantage of this arrangement is that the stop faces engage each other along a surface line avoiding spot contact engagement thus minimizing compression forces on the stop faces.

If the invention is applied in a situation where it is desirable to vary the limit of angular displacement, the stop faces may be formed as spherical surfaces with the tangent lines of the surfaces intersecting at the center of the joint.

According to a further feature of the present invention, the maximum angle of deflection can be varied by providing that the limit bolts or stop collars be carried on their respective yokes in an axially adjustable manner. By varying the axial distance between the stop faces of the stop members (i.e., either the limit bolts or the stop collars) the maximum permissible angle of deflection can be varied. This may be easily accomplished by simply adjusting the axial position of the limit bolts or the stop collars. It will be seen from the description of the invention that this can even be accomplished after assembly of the elements.

According to another feature of the present invention, the limit bolts may be secured in the yokes for axial adjustment by providing screw threads on the bolts and providing a threaded mounting plate associated with the respective yoke.

According to yet a further feature of the present invention, the limit bolts or the stop collars may be elastically mounted on their respective yokes in order to absorb sudden shock loads.

In yet another feature of the present invention, the stop collars may be provided with interconnecting sealing devices fitted on the outer circumference of the collars in order to hermetically seal the joint to prevent dirt, moisture and other foreign material from interfering with the working surfaces.

BRIEF DESCRIPTION OF THE DRAWINGS

Preferred embodiments of the present invention will be further described by way of example in connection with the accompanying drawings, in which:

FIG. 7 is a diagrammatic representation of cooperating limit bolts with respect to the center of the universal joint having tapered or beveled stop faces in engagement with each other; and FIG. 8 is a view similar to that of FIG. 7 illustrating cooperating limit bolts with respect to the center of a universal joint but having spherical stop faces.

DESCRIPTION OF THE INVENTION

Figure 1:
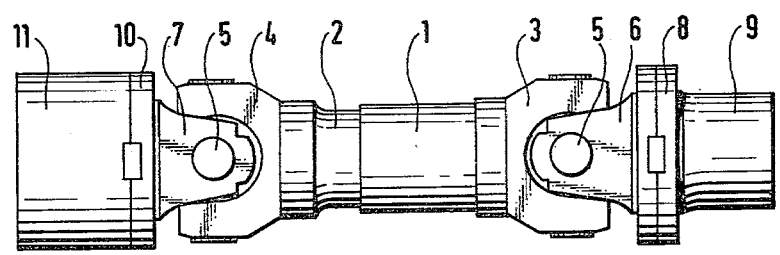
FIG. 1 is a side view of a transmission shaft having universal joints of the type incorporating the present invention.

FIG. 1 illustrates a cardan type transmission shaft in simplified form which essentially includes a first shaft portion 1 and a second shaft portion 2. The transmission shaft may be extendable as a result of shaft portion 2 being telescopically carried within shaft portion 1 so as to be slidable with respect to shaft portion 1 and the two portions may be keyed together by the use of V-splining. The transmission shaft is coupled between a drive shaft 9 and a wobbler connector element 11 through the use of universal joints. For this purpose, opposite ends of shaft portions 1 and 2 are each provided with a bifurcated yoke 3 and 4, respectively. Each yoke has a central bore for receiving cross bearing pins of a trunnion 5. A yoke 6, also having a central bore, is connected with the drive shaft 9 by a coupling flange 6. The trunnion 5 supported in yoke 3 is also supported by cross bearing pins in the central bore of yoke 6. A further yoke 7 is rigidly but detachably connected to the wobbler element 11 by flange 10 and also has a central bore for receiving the trunnion 5 carried by yoke 4. Shaft part 1 is therefore coupled to drive shaft 9 through yokes 3 and 6 between which a trunnion 5 is supported. Similarly, shaft part 2 is coupled with wobbler element 11 through yokes 4 and 7 between which is also supported a trunnion 5.

Figure 2:
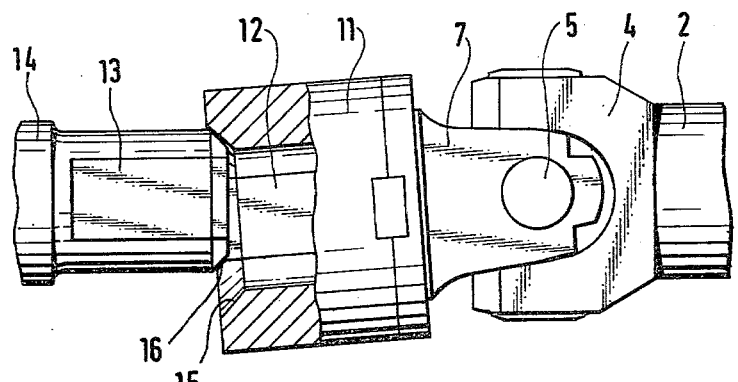
FIG. 2 is an enlarged view of one of the universal joints illustrated in the transmission of FIG. 1 for coupling a portion of a transmission shaft with a wobbler connector element, the wobbler element being partly broken away.

Referring now to FIG. 2, shaft portion 2 is shown more clearly as being coupled to wobbler element 11 through yoke 4, cross trunnion 5 and yoke 7. Wobbler element 11 is provided as a connector to a roller 14 such as might be used in a rolling mill, and has a bore 12 which has a beveled or flattened surface adapted to receive a non-circular neck 13 of the roller 14. If it should become necessary to change a roller, such as roller 14 in the mill, FIG. 2 clearly illustrates that the roller must be disconnected from the universal joint coupling it with the transmission shaft. Tilting movement of the wobbler element 11 might make re-engagement with the neck 13 of a new roller difficult. The opening of the bore 12 and the end of the neck portion of the roller 14 are each provided with a chamfered surface 15, 16, respectively, to make insertion of a new roller neck into the bore 12 easier. To avoid the necessity of connecting the roller 14 to the transmission shaft through the use of flange couplings which would require loosening and tightening bolts or screws, the wobbler element 11 is provided for quick connection to the neck 13. For this purpose, the bore 12 of the wobbler element 11 has the non-circular cross section which conforms to the non-circular cross section of the neck 13 to ensure proper torque transmission to the roller. Therefore, the neck 13 of a new roller 14 need merely be inserted into the bore 12 of the wobbler element to be coupled with the transmission shaft without requiring bolted flange couplings or oil pressure joints, which would be excessively expensive and require additional time to complete the coupling.

Figure 3:
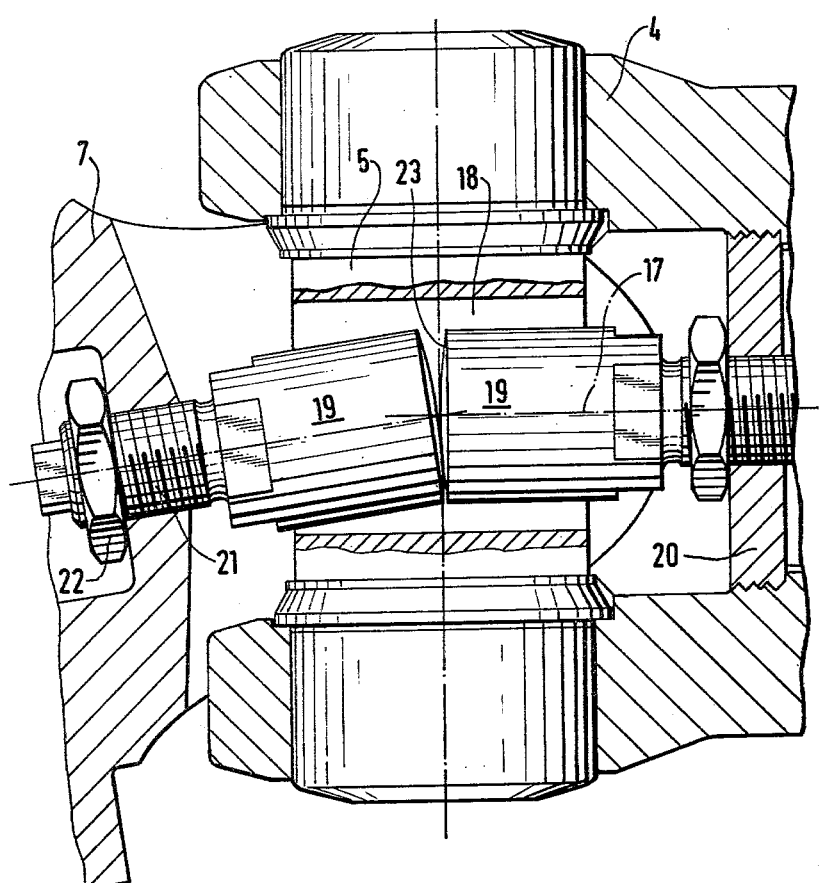
FIG. 3 is an enlarged sectional view illustrating one embodiment of the present invention incorporated in a universal joint.

FIG. 3 illustrates one embodiment of the invention for limiting the maximum angular deflection of the universal coupling between yokes 4 and 7, thus limiting the maximum angular deflection between the yokes of the universal joint. Yoke 7, which carries wobbler element 11, is coupled with yoke 4 for angular movement with respect to yoke 4 through the cross trunnion 5. In this embodiment, trunnion 5 has a hollow interior cavity 18 in the region of and on both sides of the axis of rotation 17. A limit bolt 19 is carried by each of the yokes 4 and 7 and extends into the cavity 18 when the yokes are coupled by the trunnion 5. The limit bolts 19 can either be carried on a mounting plate 20 which is threadably connected to the yoke, as illustrated on yoke 4, or may be directly received in an opening of the yoke by a screw thread. Further, the limit bolts 19 may be provided with a screw bolt 21 and counter-nut 22 for supporting the limit bolt 19 on the yokes in a manner so that their lengths extending from the yokes may be axially adjustable. The end faces 23 of each of the limit bolts 19 are adapted for engagement with each other when the axes of the bolts 19 are deflected with respect to each other at a maximum predetermined angle, thereby preventing further angular deflection of the yoke 7 with respect to yoke 4 beyond the predetermined chosen angle.

Figure 4:
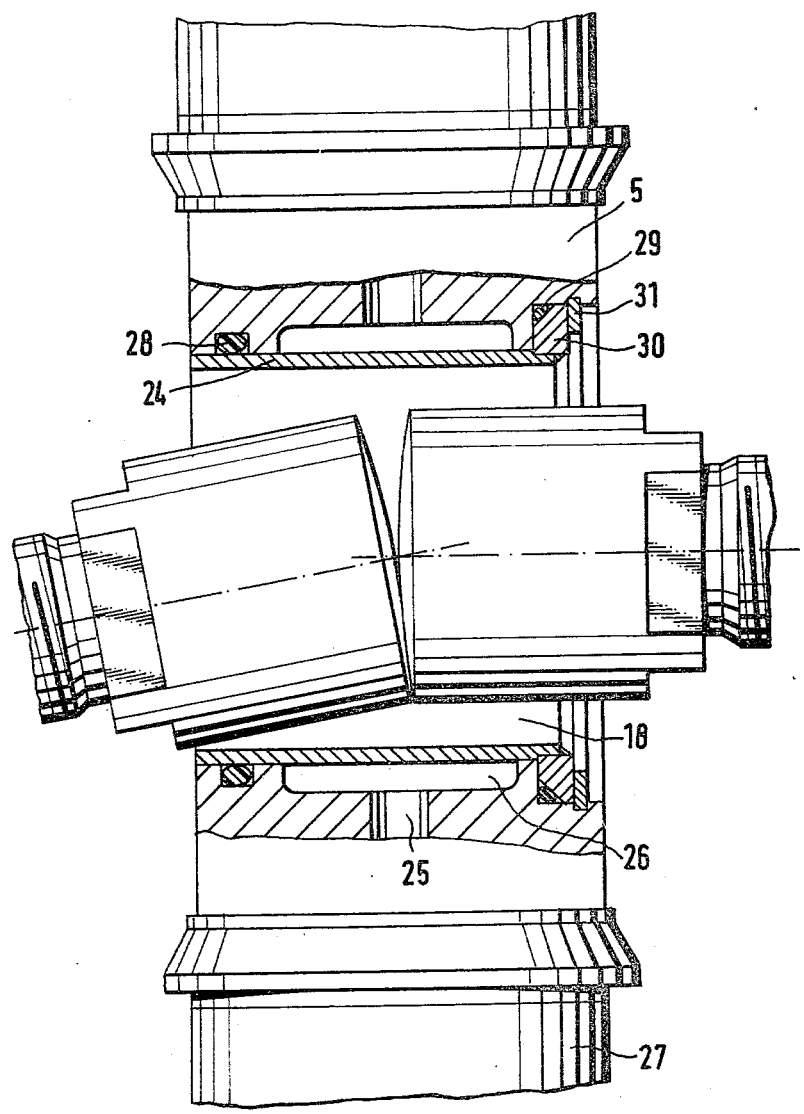
FIG. 4 is an enlarged partial sectional view of the trunnion shown in FIG. 3 having limit bolts with spherical stop faces.

FIG. 4 again illustrates the position of the limit bolts 19 within the cavity of the trunnion 5 and further illustrates that the cavity may be bounded by a bushing 24. This bushing 24 is intended to prevent any lubricant, which may be contained in the grease channels 25 and annular channel 26 for lubricating the pins 27 of the trunnion, from entering into the cavity 18. It should be appreciated that pins 27 may further be provided with slide or roller bearings. Seals 28 and 29 are also provided at opposite ends of the bushing 24. An intermediate ring 30 and a circular clip 31 are used to maintain the fixed position of the bushing 24.

Figure 5:
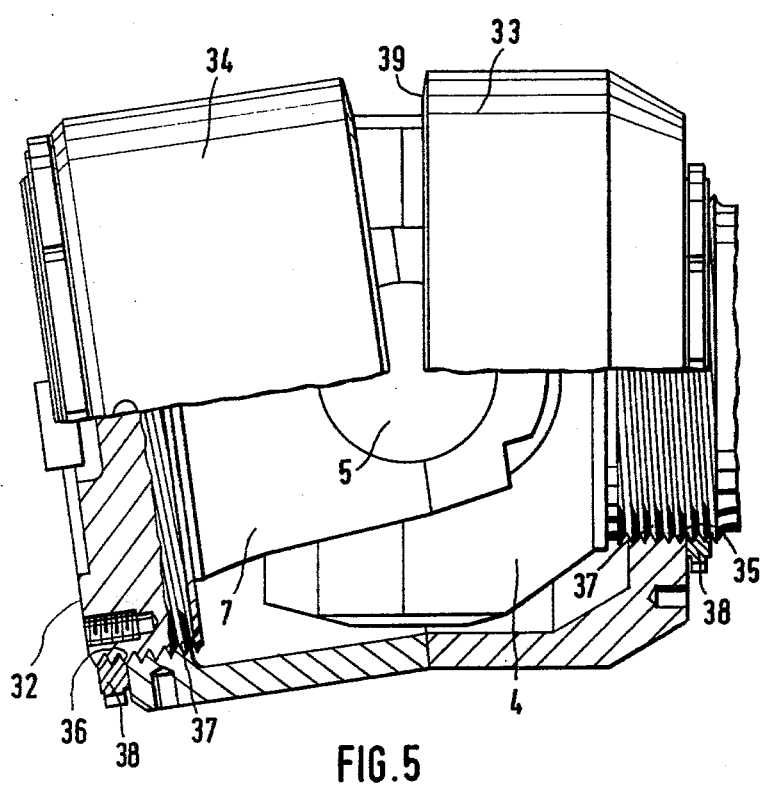
FIG. 5 is a partial sectional view of a universal joint according to another embodiment of the present invention using stop collars.

FIG. 5 illustrates a further embodiment of the present invention for limiting the angular deflection of one yoke of the universal joint with respect to the other. This arrangement may be used without the need for considering the diameter of the joint. This arrangement of a universal joint also includes a yoke 4 which is coupled by a cross trunnion 5 with the other yoke 7. End 32 of yoke 7 is also adapted to receive a wobbler element 11. In this embodiment, stop members are also used for limiting the degree of angular deflection of yoke 7 with respect to yoke 4. The stop members in this embodiment, however, are formed by collars 33 and 34 (shown partially broken away) which have bores 35 and 36, respectively, which are carried for axial movement on the outside walls of yokes 4 and 7, respectively. The inside of the bore of each collar is provided with a thread 37 affording the axial adjustment along the yokes. A guard ring 38 is also provided to fix the adjusted position of the collars on their respective yokes. Upon angular deflection of one of the yokes with respect to the other, the end face 39 of one of the collars will engage and bear against the end face 39 of the other collar thereby preventing further angular deflection and, therefore, fixing the maximum limit of angular deflection of one of the yokes with respect to the other. This will ensure that the angle of deflection will be limited to a maximum value regardless of any angular position which may be occupied by the transmission shaft when it stops rotation, since the stop collars 33 and 34 are rotationally symmetrical with respect to the axis of rotation of the respective yokes. It should be noted that this is also true of the limit bolts which serve as the stop members in the embodiment illustrated in FIG. 3. The end faces 39 of each of the stop collars are preferably conical or beveled for ensuring a constant maximum angle and reducing points of compression on the opposite end faces of the collars. As a result, the use of conical end faces avoids, to a large degree, small points of pressure contact between the collar end faces.

Figure 6:
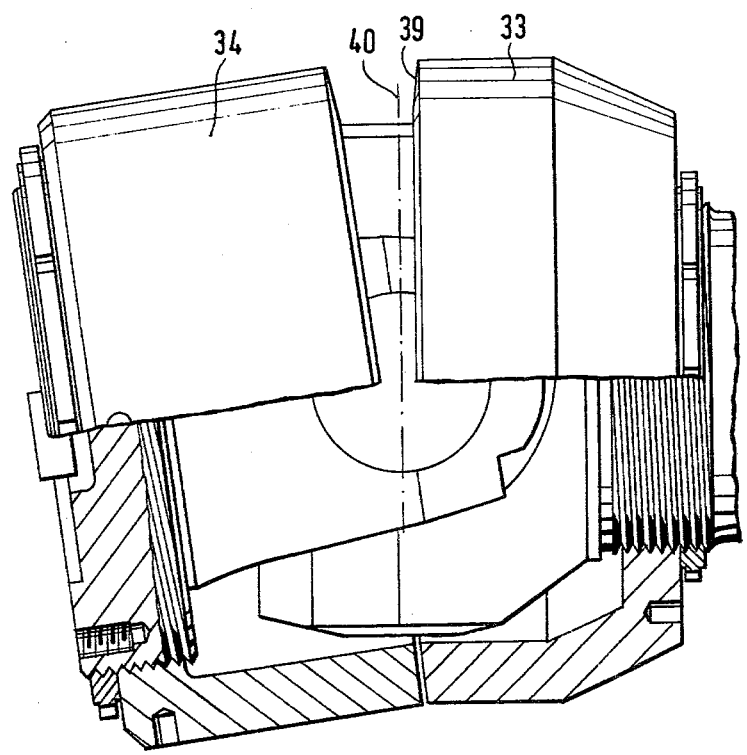
FIG. 6 is a view similar to that of FIG. 5 in which the stop faces on the stop collars are spherical.

The embodiment of the invention illustrated in FIG. 6 is similar to that shown in FIG. 5. However, in this embodiment, the end faces 39 of the stop collars 33 and 34 are spherical instead of being conical or beveled. This permits a large range of limit angles to be selected by axial adjustment of the collars 33 and 34 since, when the axes of the yokes of the joint are aligned with each other, the end faces 39 of the collars 33 and 34 can be repositioned closer to or further away from the axis 40.

FIGS. 7 and 8 illustrate the basic principle by which the maximum angle of deflection of the universal joint may be limited by limit bolts 19 used in the embodiment of FIG. 3. As with the end faces 39 of the collars 33 and 34, the cooperating end faces of the limit bolts 19 may have either conical surfaces 41 (illustrated in FIG. 7) or spherical surfaces 44 (illustrated in FIG. 8). In the illustration of FIG. 7, the ends 23 of the limit bolts 19 have conical surfaces 41 to define the predetermined angle of deflection of the universal joint when the end faces of the cooperating bolts engage each other. For exact engagement of such conical faces at the predetermined angle of deflection, it is necessary that the pitch axis 42 of the conical surfaces of each bolt intersect each other at the precise center 43 of the universal joint. This will ensure that there will be no spot contact engagement between the conical surfaces of the cooperating limit bolts. To provide precise adjustment of the pitch axes 42 of the limit bolts so that they extend through the center 43 of the joint, the bolts 19 may be axially adjusted by means of the screw bolts 21 and counter-nuts 22 as illustrated in FIG. 3.

As noted above, FIG. 8 illustrates the end faces 23 of the limit bolts as having spherical surfaces 44. When using such spherical surfaces, spot contact and point pressure engagement between the end faces of the cooperating bolts cannot be completely avoided at the maximum angle of deflection. However, this arrangement permits a variety of maximum angles to be preselected and fixed by adjustment of the stop members. When using spherical surfaces on the end faces of the stop members, it is also necessary that tangent lines 45 to the spherical surfaces 44 pass through the center 43 of the universal joint. The size of the deflection angle can, however, be varied by varying the distance 46 between the end faces 23 and the axis 40. For example, when the axes of the yokes are in a straight aligned position (i.e., a non-deflected position of the joint) the distance 46 between the end face of one of the limit bolts and the center 43 of the joint must be equal to that between the end face of the other bolt and the center of the joint 43. By varying this distance, the angle at which the end faces engage each other will vary.

While the present invention has been described and illustrated with respect to various embodiments which produce satisfactory results, it will be appreciated by those skilled in the art, after understanding the purposes of the invention, that various changes and modifications may be made without departing from the spirit and scope of the invention, and it is therefore intended to cover all such changes and modifications in the appended claims.

What is claimed is:

1. A universal joint comprising first and second yokes, a bore extending through each yoke, a cross trunnion carried between said first and second yokes in said bores of said yokes, and a stop member carried by each of said yokes, each said stop member having an end face adapted for engagement with the end face of the other stop member to limit the amount of angular deflection of said universal joint to a predetermined maximum value at an angle of rotation of the joint, an axial bore extending through said cross trunnion and wherein said stop member comprises a limit bolt axially extending through said yoke into said bore of said trunnion, and the end faces of each of said limit bolts being concentric with the axis of rotation of each of said yokes.

2. A universal joint comprising first and second yokes, a bore extending through each yoke, a cross trunnion having cylindrical bearing pins axially carried in respective bores of said first and second yokes whereby said trunnion is supported between said yokes, an axial bore extending through said trunnion, a limit bolt extending axially through each of said yokes into said bore of said trunnion, each limit bolt having an end face adapted for engagement with the end face of the other limit bolt to thereby limit the amount of angular deflection of said universal joint, said end face of each of said limit bolts being concentric with the axis of rotation of its respective yoke.

3. The universal joint according to claim 2 wherein said end face of each limit bolt is conical, and wherein the cone pitch axes of the end faces of opposite limit bolts intersect each other at the center of the joint.

4. The universal joint according to claim 2 wherein said end faces of said limit bolts are spherical, and wherein a line tangent to the surface of each said end face intersects each other at the center of said universal joint when said end faces engage each other.

5. The universal joint according to claim 2 wherein said limit bolts are carried in said yokes for axial adjustment to vary the limit of angular deflection of said universal joint.

6. The universal joint according to claim 2 wherein said limit bolts are threaded being carried on a threaded mounting plate associated with each respective yoke for axial adjustment to vary the limits of angular deflection.

7. The universal joint according to claim 2 wherein each limit bolt is elastically supported in its respective yoke.

* * * * *